Jan. 17, 1939.  H. MÜLLER  2,144,461
TOY MOTOR VEHICLE
Filed Feb. 20, 1936  7 Sheets-Sheet 1
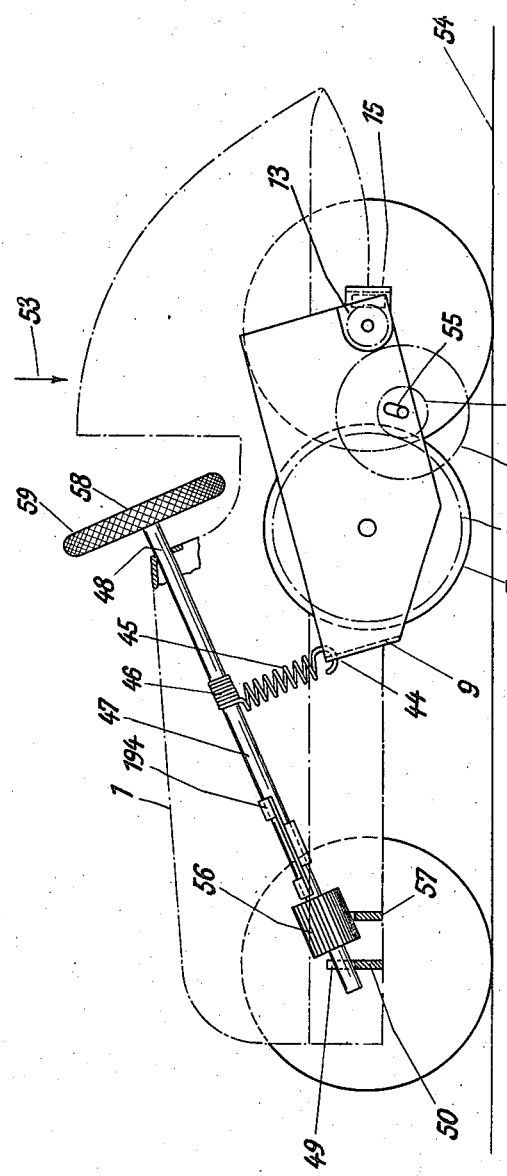
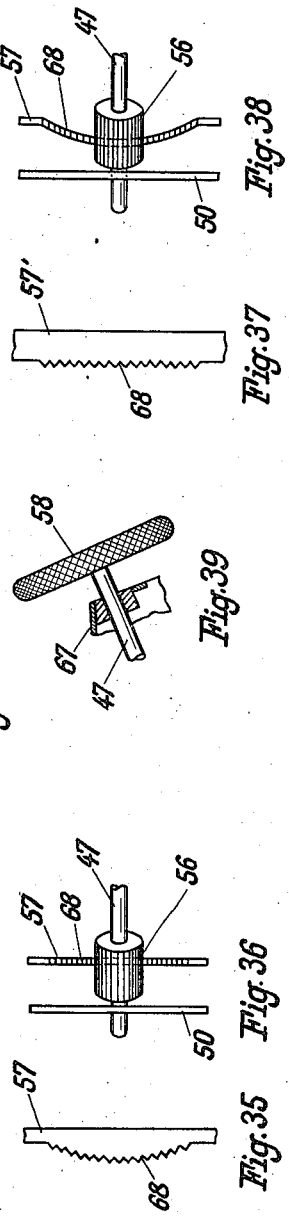
Inventor:
Heinrich Muller
By A. H. Weller
Attorney

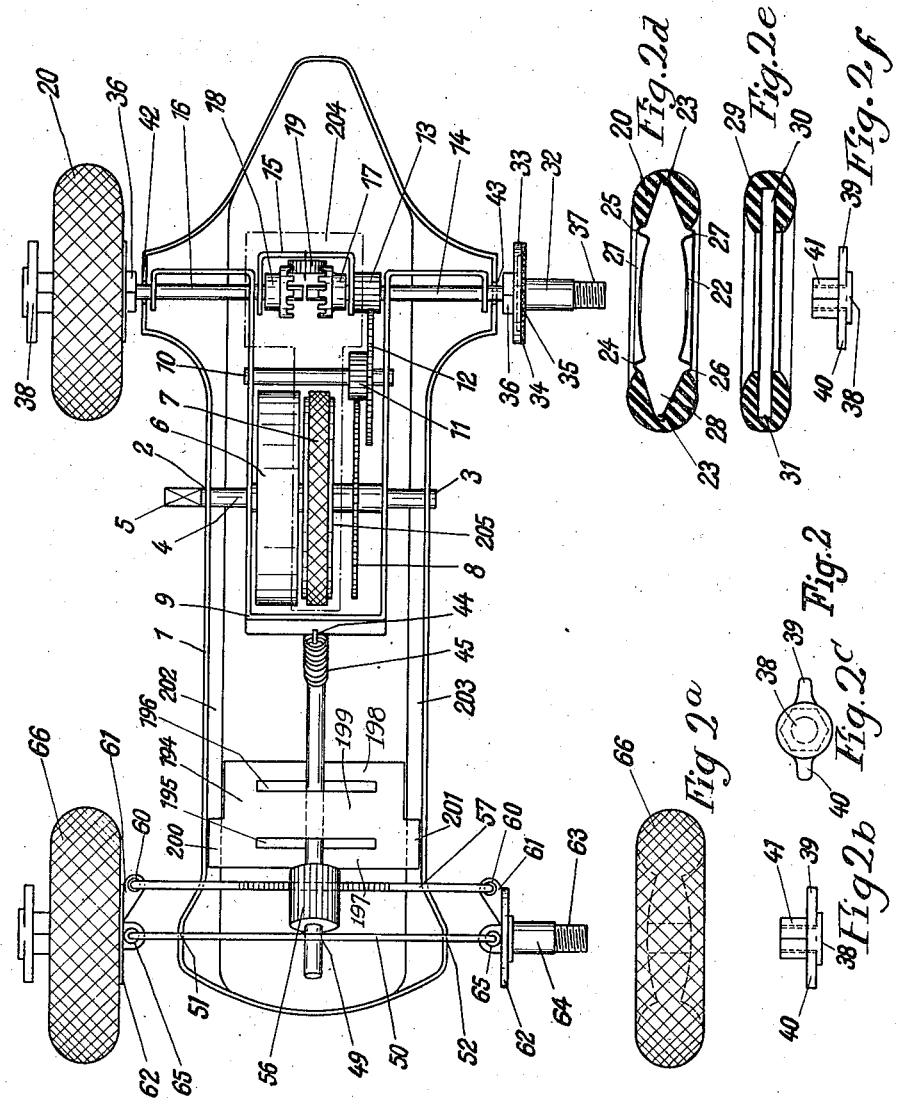

Jan. 17, 1939.  H. MÜLLER  2,144,461
TOY MOTOR VEHICLE
Filed Feb. 20, 1936  7 Sheets-Sheet 3

Inventor:
Heinrich Muller
By A. Dr. Weller
Attorney

Jan. 17, 1939.  H. MÜLLER  2,144,461
TOY MOTOR VEHICLE
Filed Feb. 20, 1936  7 Sheets-Sheet 4
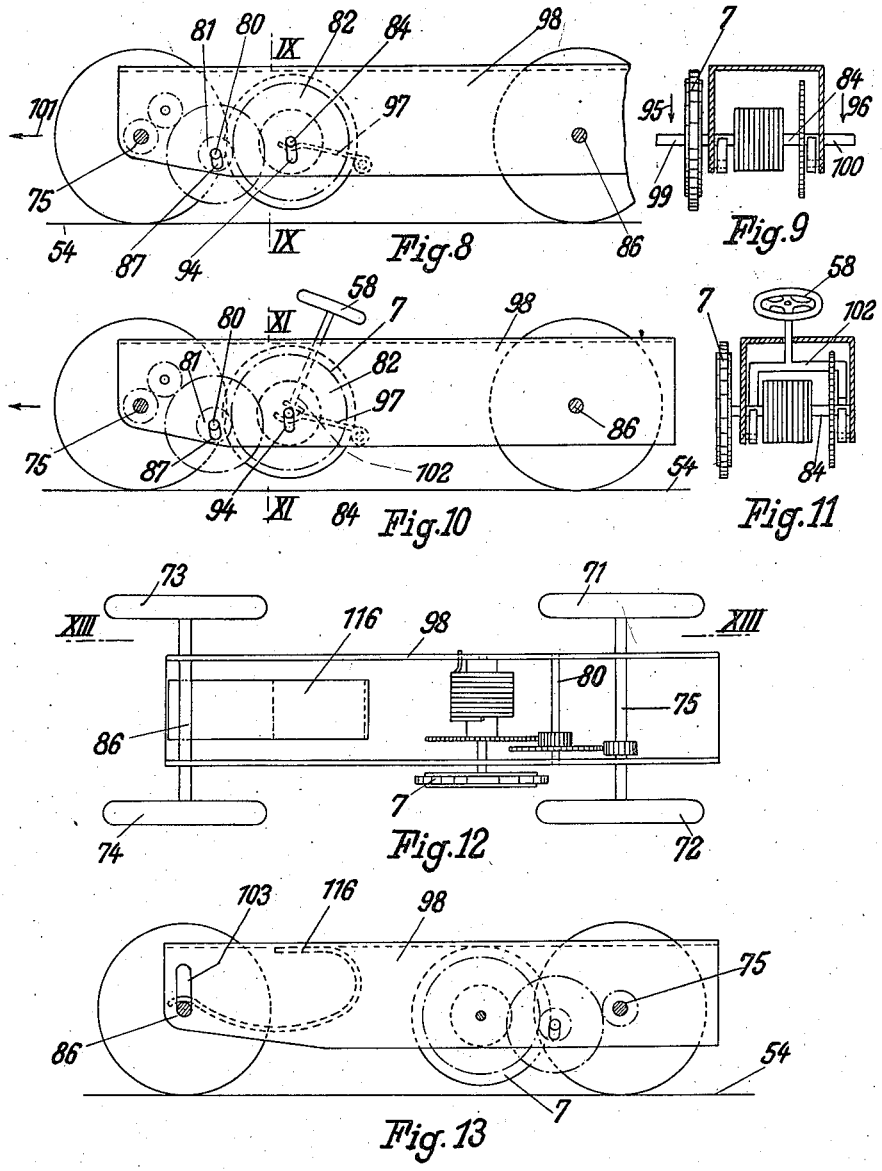

Jan. 17, 1939.  H. MÜLLER  2,144,461
TOY MOTOR VEHICLE
Filed Feb. 20, 1936  7 Sheets-Sheet 5
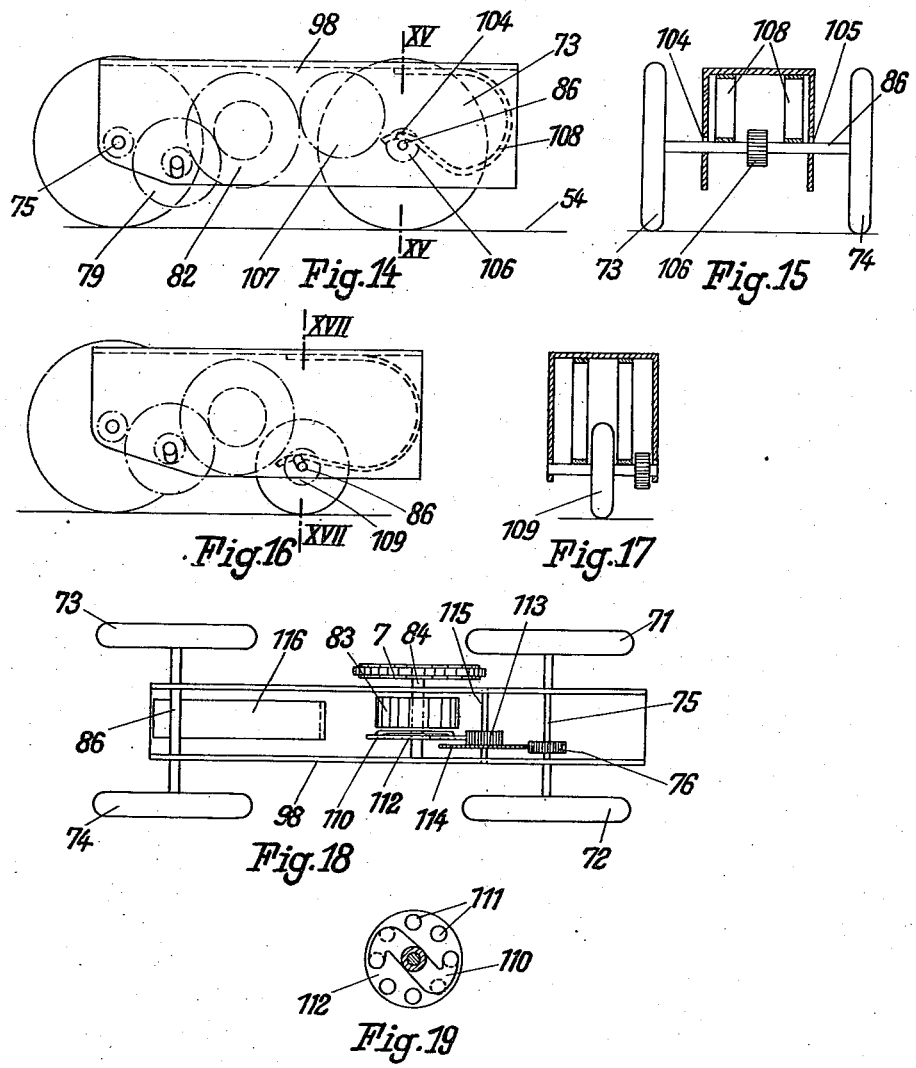
Inventor:
Heinrich Muller
By A. R. Weller
Attorney Jan. 17, 1939.   H. MÜLLER   2,144,461
TOY MOTOR VEHICLE
Filed Feb. 20, 1936   7 Sheets-Sheet 6

Inventor:
Heinrich Muller
By A. Dr. Weller
Attorney

Jan. 17, 1939. H. MÜLLER 2,144,461
TOY MOTOR VEHICLE
Filed Feb. 20, 1936 7 Sheets-Sheet 7
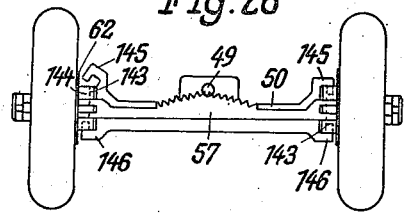
Fig. 26
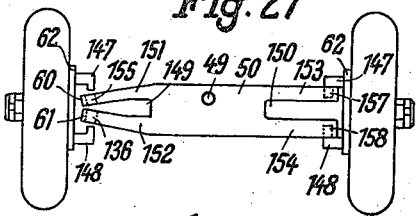
Fig. 27
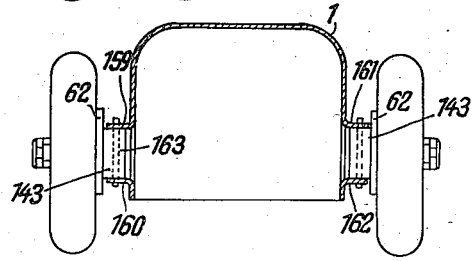
Fig. 28
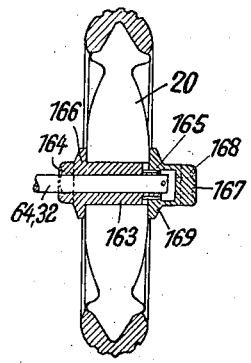
Fig. 29
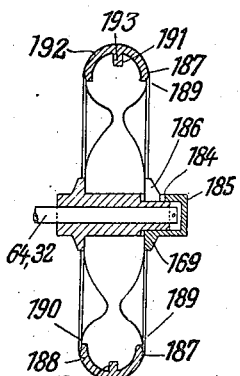
Fig. 30
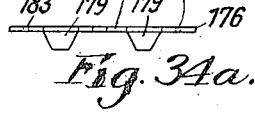
Fig. 34a.
Fig. 34b.
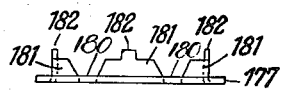
Fig. 34
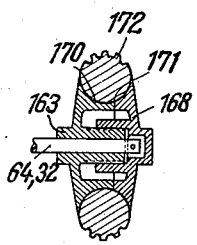
Fig. 31
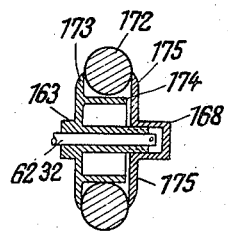
Fig. 32
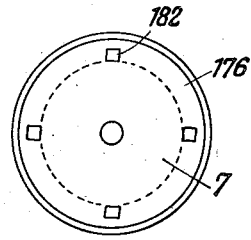
Fig. 33
Inventor:
Heinrich Muller
By A. D. Weller
Attorney Patented Jan. 17, 1939

2,144,461

UNITED STATES PATENT OFFICE 2,144,461

TOY MOTOR VEHICLE

Heinrich Müller, Nuremburg, Germany

Application February 20, 1936, Serial No. 64,821
In Germany October 28, 1935

34 Claims. (Cl. 46—213)

The invention relates to a toy vehicle, especially a toy motor car.

According to the invention a vehicle is created which is wound up preferably without using a key and able to be driven in small circles. For obtaining this purpose according to the invention a friction wheel with a particular coupling is provided, a particular supporting of the front wheels, as well as a differential-gear and a particular steering device. A large dimensioned construction of the steering wheel renders it further possible to use the motor car for demonstrating the traffic rules.

The annexed drawings illustrate by way of example the invention in which

Fig. 1 is a side view of toy motor car embodying the invention,

Fig. 2 a bottom view of the toy illustrated in Fig. 1,

Fig. 2a is an elevational view of a wheel,

Fig. 2b shows a similar view of a nut,

Fig. 2c illustrates a side elevational view of the nut shown in Fig. 2b,

Fig. 2d depicts a cross section of a wheel of the toy vehicle,

Fig. 2e is a cross sectional view of a rubber tire for the toy vehicle,

Figure 3:
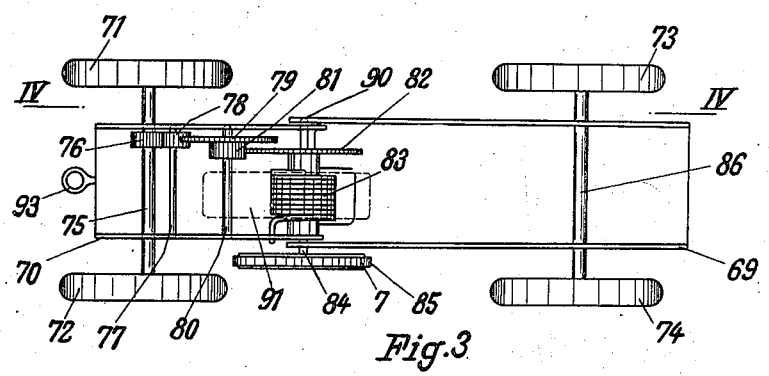
Figure 4:
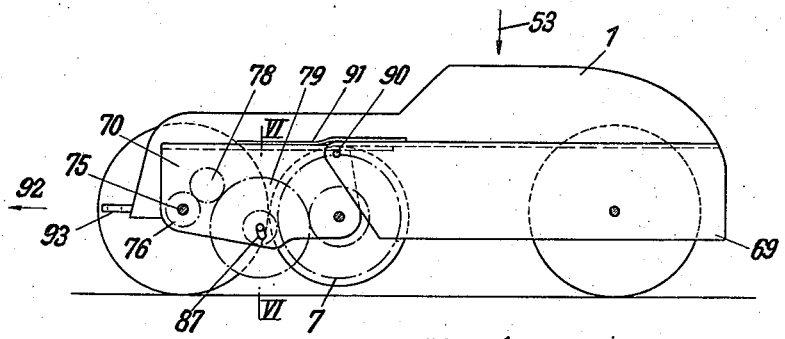
Figure 5:
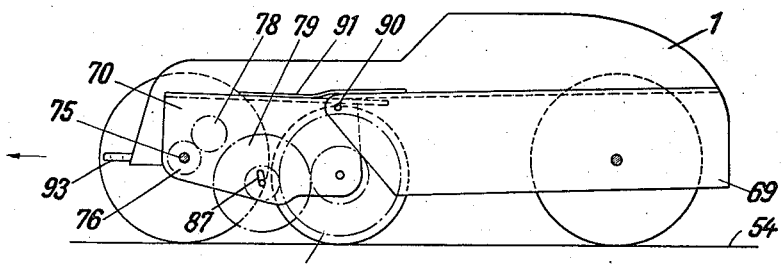
Figures 6, 7:
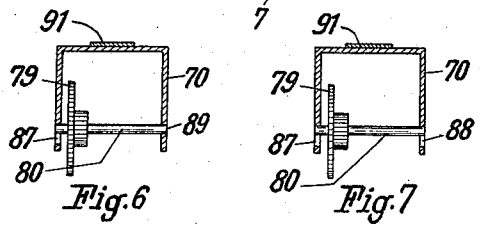
Figure 20:
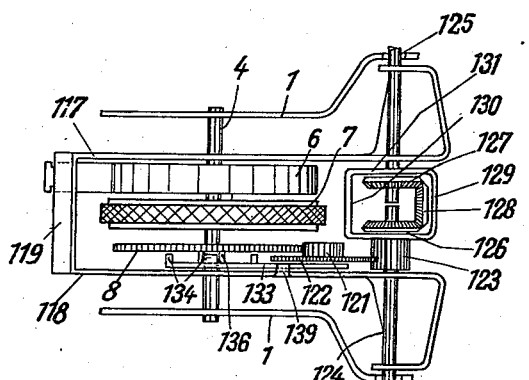
Figure 22:
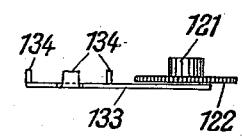
Figure 23:
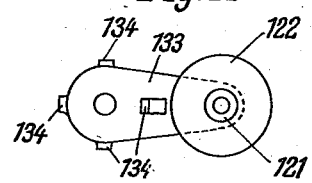
Figure 21:
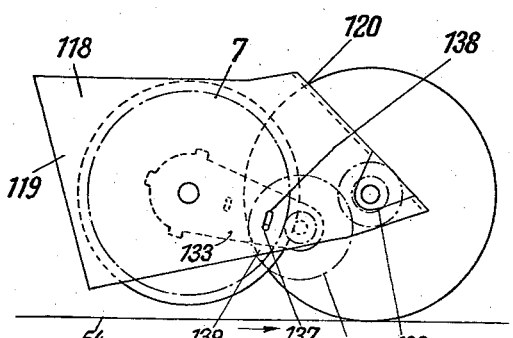
Figure 24:
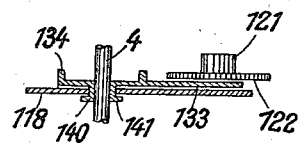
Figure 25:
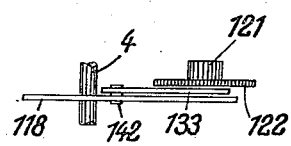

Fig. 2f shows an elevational view of a nut for fastening a wheel of the toy vehicle, Fig. 3 is a further bottom view of the toy, Fig. 4 is a side view taken on line IV—IV of the Fig. 3, Fig. 5 an illustration of the Fig. 4 during the winding operation, Fig. 6 a section taken on line VI—VI of the Fig. 4, Fig. 7 a modified construction of the section shown in Fig. 6, Fig. 8 a form of construction of the spring motor with rockably journaled spring motor shaft, Fig. 9 a section taken on line IX—IX of the Fig. 8, Fig. 10 the arrangement of the spring motor shaft being depressed by the steering wheel, Fig. 11 a section taken on line XI—XI of the Fig. 10, Fig. 12 a bottom view of an other modified construction of the spring motor, Fig. 13 a section taken on line XIII—XIII of the Fig. 12, Fig. 14 the construction of the idle running wheels as friction wheels, Fig. 15 a section taken on line XV—XV of the Fig. 14, Fig. 16 a winding up device with three wheels, Fig. 17 a section taken on line XVII—XVII of the Fig. 16, Fig. 18 a driving device with latch mechanism, Fig. 19 a detail part of the Fig. 18, Fig. 20 a bottom view of a modified spring motor, Fig. 21 a side view of Fig. 20, Fig. 22 a detail view of the Fig. 20, Fig. 23 a side view of the Fig. 22, Fig. 24 the fastening of the rocking lever, Fig. 25 a modified fastening arrangement of the rocking lever, Fig. 26 the fastening of the front wheels, Fig. 27 a modified fastening arrangement of the front wheels, Fig. 28 a further modified fastening arrangement of the front wheels, Fig. 29 a construction of the wheels, Fig. 30 a wheel cap, Fig. 31 a modified construction of the wheels, Fig. 32 a further form of construction, Fig. 33 the construction of the friction wheel, Fig. 34 is a cross sectional view of one part of the friction wheel, Fig. 34a shows a similar view of the other part of the friction wheel, Fig. 34b illustrates a cross sectional view of the friction ring for the friction wheel, Fig. 35 is a plan view of the rack, Fig. 36 the view of the steering, Fig. 37 a further construction of the rack, Fig. 38 a steering with the rack of the Fig. 37, Fig. 39 a fastening of the steering wheel.

The toy body 1 as illustrated in the Figures 1 and 2 is provided with holes 2 and 3 across which passes the winding shaft 4 having an extension 5 so as to allow the winding up of the spring motor by means of a key. On the winding shaft are mounted the spring 6, the friction wheel 7 and the spur wheel 8, which are all located within the frame 9 of the spring motor. The spur wheel 8 engages with the pinion 11 fixed on the shaft 10, while the spur wheel 12 fixed on the same shaft 10 engages with the pinion 13 being loosely journaled on the one of the rear running axles 14. The pinion 13 is rigidly connected with the U-shaped stirrup member 15 journaled loosely on both the rear running axles 14, 16. Each of the axles 14 and 16 carry at their inner end a crown wheel 17 and 18 respectively, with which engages the planet wheel 19 journaled turnably at the stirrup member 15. The pinion 13, the crown wheels 17 and 18, as well as the planet wheel 19 journaled on the stirrup member 15 constitute a differential gear by means of which the power of the spring 6 is transmitted to the rear running axles 14, 16. The friction wheel 7 is preferably located in the longitudinal middle axis of the vehicle 1, so that by winding up no component forces can result.

The rear running axles 14, 16 carry the wheels 20. These may consist of two discs 21 and 22 which are overlapped at 23. The disc 21 is provided with projections 24 and 25 and the disc 22 with projections 26 and 27. The object of these projections is to provide supporting surfaces for the terminal portions of the tire. In addition to this, the projections closely simulate the appearance of the rims of conventional automobile wheels. The outer circumference 28 of the wheels has wedge shaped form, on which a rubber tire 29 provided with a deep groove 30 of rectangular cross section is put on. By this fact the rubber ring 29 can be formed narrow, because by putting the rubber ring over the wedge 28 the inner end of said rubber ring is expanded, so that the latter shaped with tire cross section at 31 imitates in its appearance the true motor car tire.

The wheels 20 are arranged on axle stumps 32 forming the ends of the axles 14 and 16. The axle stumps carry on their inner side a disc 33 having a ring shaped aperture 34, the remaining rim may be provided with a friction lining 35. The disc has preferably the appearance of the brake drums. The inner ends of the axle stumps carry nuts 36 and the outer ends are provided with threads 37. The wheels 20 are pushed on the axle stumps and thus clamped by aid of the nuts 38 being screwed on the threads 37, whereby the wheels rest against the lining 35. The nuts 38 are provided with lateral projections 39 and 40 and constructed at their rear part as nuts 41. The ends of axles 14 and 16 are threaded and are engaging corresponding inner threads provided in axle stumps 32. The rear portion of axle stumps 34 is provided with an integrally formed hexagonal nut 36 which may be engaged with a wrench when it is desired to put on or to remove wheel caps 38.

The frame of the driving work 9 is journaled turnably about the shaft 4 passing through the holes 2 and 3. In order to enable the turning the rear axles 14 and 16 are arranged within slots 42 and 43 being adapted in the toy body frame. A spiral spring 45 is positioned with its one end in a hole 44 of the body frame 9 while its other end 46 embraces the steering spindle 47. Said spiral spring may be substituted by an elastic band. The steering spindle 47 is journaled within a hole 48 of the toy body and within a hole 49 of a cross rod 50 which is fixed at 51 and 52 at both sides of the toy body 1. The spring motor frame 9 journaled rockably about the shaft 4 is drawn upwards by the spring 45 whereby the rear running axles 14, 16 are pressed downwards within the slots 42, 43.

In applying a pressure on the toy vehicle in the sense of the arrow 53 according to Fig. 1 the rear running axles 14, 16 move upwards in their slots 42, 43 under expansion of the spring 45, so that the friction wheel 7 comes in contact with the ground 54. The spring 6 is wound up by rolling the friction wheel 7 on the ground 54 during the motion of the toy vehicle over the same in a direction opposite to that of the normal forward movement of the vehicle. Shaft 10 of spur wheel 12 is supported in a slot 55 at one of its ends. When during the winding operation friction wheel 7 is rotated in a direction opposite to that of the forward travel of the vehicle, pinion 11 will be rotated and due to the pressure caused by this rotation, its shaft 10 will be displaced downwardly in the obliquely directed slot 55. This displacement of shaft 10 will increase the distance between spur wheel 12 and pinion 13 and will cause disengagement thereof. In this manner the rear running axles 14, 16 are uncoupled from the spring shaft 4, so that the winding up and the demonstration of traffic events can be executed without any disturbance.

On the steering spindle 47 is fixed the toothed wheel 56 which engages with a toothed rod 57 during the turning of the steering wheel. The latter is constructed preferably in such a manner that it does not project over the circumference of the toy body frame 1. As to enable a better grip the steering wheel is checkered at 59. The toothed rod 57 is fixed within the holes 60 of the steering lever 61 which are arranged on brake drum shaped discs 62 carrying the front wheel stumps 64 provided with a thread 63.

The discs 62 are fixed turnably at the cross rod 50 by means of eyelets 65 about a vertical axis. The front wheels 66 are constructed in the same manner or in another manner as the rear wheels 20 and are fastened on the axle stumps 64 by aid of the wheel caps 38 screwed on the threads 63. The projections 39 and 40 arranged on the wheel caps 38 serve for the purpose that the latter can be knocked off from the thread 63 by aid of a hand hammer. The nut 41 serves for the purpose that the caps 38 can be unscrewed by aid of a wrench.

Since the steering spindle 47 according to the Figs. 1 and 2 serves as counter bearing 46 for the spring 45, the steering spindle is held by the spring tension with friction in its bearings 48, 49. When desired a resilient clamp device 194 can be provided which keeps the steering spindle 47 so rigidly, that an accidental turning of the same is impossible. The clamp device 194 comprises a sheet-like member having two slots 195, 196 provided therein through which the steering spindle is inserted. Slots 195, 196 divide the clamping device or plate 194 into three parts 197, 198, 199 of which two, 197 and 198, frictionally engage one side of steering spindle 47 and the third, 199, engages the other side of the steering spindle. The clamp device 194 bears with projections 200, 201 against corresponding ribs 202, 203 of the toy frame 1 and is rotationlessly retained therein. Due to the substantial friction between steering spindle 47 and parts 197, 198 and 199, the spindle is positively retained in any of its positions and accidental displacements thereof are prevented.

It is also possible, as indicated in Fig. 39, to give the steering spindle 47 the necessary friction by arranging advantageously an elastic lining 67 deposited in the body frame 1 or in the cross rod 50. As indicated in the Figs. 35 and 36 the steering rod 57 is provided with teeth 68 adapted on a segment lying level with the said rod. Since during the steering the rods 50 and and 57 change their distance from each other an engagement of the pinion 56 with the teeth 68 is secured without any disturbance.

The rack may be bent in a level lying vertical to it, as shown in Figs. 37 and 38, so that in this manner the engagement of rack 57' having teeth 68 is secured in every position of the steering spindle 47. The dimensions of the rack 57' are so chosen that the teeth 68 do not project above the body frame 1 in any position of the steering spindle 47.

In the modified embodiment illustrated in Figs. 3 and 4 the spring motor frame consisting of both the parts 69 and 70 is placed within the toy body 1. The front axle 75 carries the pinion 76 being coupled with the spur wheel 79 of the spring motor shaft 80 by means of the pinion 78 on the shaft 77. Thereby the front wheels 71 and 72 are the driving wheels and the rear wheels 73 and 74 the running wheels. On shaft 80 is mounted pinion 81 engaging spur wheel 82 which is fastened on shaft 84. Shaft 84 carries the motor spring 83. On shaft 84 is further secured the friction wheel 7, being covered on its running surface for increasing the friction with a covering 85 of yielding material. The rear wheels 73 and 74 are arranged on a common axle 86 supported in the frame part 69. The shaft 80 is guided with its one end carrying the spur wheel 79 and the pinion 81 in a slot 87 and as shown in Fig. 7 in the slots 87, 88 respectively, while the other end is supported rockably in the casing 69 at 89. The front part 70 of the frame is jointedly connected with the rear part 69 of the frame by aid of a pin 90. These parts 69 and 70 are resiliently held in their relative position by the spring 91, as shown in Fig. 4. When a pressure is applied on the toy vehicle from above in the direction of the arrow 53, the part 70 opposite the part 69 is moved about the joint 90 against the action of the spring 91, whereby the friction wheel 7 comes in contact with the ground 54, as illustrated in Fig. 5. Is the toy then moved in direction of the arrow 92 as indicated on Fig. 4 the spring 83 is wound up by rolling the friction wheel 7 upon the ground 54 in a direction opposite to that of the normal forward movement of the vehicle. When during the winding operation friction wheel 7 is rotated, spur wheel 79 will be rotated and due to the pressure caused by this rotation its shaft 80 will be displaced downwards in slots 87 and 88. Thereby the spur wheel 79 disengages the pinion 78, so that the running wheels 71, 72 can turn independently of the winding up mechanism of the spring. Under the pressure of the spring 83 being wound up the spur wheel 79 is coupled again with the pinion 78, so that the power of the tensed spring is transmitted to the driving wheels 71, 72. After the spring 83 is run down the toy vehicle runs further by the imparted impetus. As the turning pinion 78 disengages again the spur wheel 78 on the shaft 80 guided in the slot 87, the winding mechanism of the spring is uncoupled from the front driving wheels 71, 72. This arrangement allows, as in the case in all shown illustrations of the toy, to draw also such a toy vehicle independently of the spring mechanism by a cord attached to the eyelet 93, or to draw it without mechanical driving by hand, or push it by the imparted impetus without disturbance by the driving mechanism. In this manner it is easily possible to use the toy vehicle for the demonstration of traffic occurrences, if it is constructed as toy motor car.

In the form of construction illustrated in Figs. 8 and 9 the spring shaft 84 is journaled on its both ends in a slot 94, so that it can be pressed downwards against the action of the spring 97 in the direction of the arrows 95, 96 indicated in Fig. 9. Thereby the toy frame 98 is made in one piece. By pressing on the ends 99, 100 of the shaft 84 the friction wheel 7 bears against the ground 54, so that the spring motor mechanism is wound up by rolling the toy vehicle in the direction indicated by the arrow 101 in Fig. 8. The slot 94 has its curved centre point in the axle 80 supported in the slot 87, so that the spur wheel 82 engages permanently with the pinion 81. The uncoupling is secured in the manner above mentioned by a rocking motion of the shaft 80.

In the arrangement shown in Figs. 10 and 11 the shaft 84 is moved downwards by pressure on a part of the toy body constructed as motor car and thereby the friction wheel 7 brought in contact with the ground 54. The part to be pressed down consists according to the illustrations of the steering wheel 58 provided with a stirrup member 102, which is connected with the shaft 84. When a pressure is applied on the steering wheel 58 the shaft 84 with the friction wheel 7 is pressed downwards against the action of the spring 97 in the same manner, as illustrated in the Figs. 8 and 9.

In Figs. 12 and 13 a rigid frame 98 is provided in which the axle 86 of the running wheels 73, 74 is journaled within a slot 103 arranged in both sides of the frame 98. The axle 86 and the front wheels 73, 74 are pressed downwards by a spring 116 arranged on the frame 98. When pressure is applied on the frame from above, axle 86 of the running wheels 73, 74 is so far moved upwards within the slot 103, that the friction wheel 7 comes in contact with the ground 54, whereby the spring motor mechanism can be wound up. In this form of construction it is not necessary to arrange an uncoupling between the friction wheel 7 and the driving wheels 71, 72, if the slot 103 is so long, that the driving wheels 71, 72 can be lifted from the ground during the toy being depressed.

In Figs. 14 and 15 the running wheels 73, 74 rigidly connected to shaft 86 serve as friction wheels and cause the winding of the spring by the friction on the ground 54 when the frame 98 is depressed and the toy vehicle is pushed. Shaft 86 carrying a pinion 106 is journaled in slots 104 and 105 provided in the frame 98. A spur wheel 107 engages spur wheel 82 fixed on the spring shaft. The shaft 86 carrying the pinion 106 is pressed downwards within the slots 104, 105 by the action of the spring 108, so that the pinion 106 and the spur wheel 107 are out of engagement. The running wheel 73 therefor runs light. If pressure is applied on the frame 98 the shaft 86 journaled in the slots 104, 105 slides upwards, overcomes the power of the spring 108, whereby the pinion 106 engages spur wheel 107. By pushing on the ground 54 the turning motion of the wheels 73, 74 is transmitted to the spur wheel 82 and thereby to the spring motor mechanism. The spur wheel 79 uncouples during the motion in the already mentioned manner the shaft 75 from the spur wheel 82, so that the toy vehicle can be pushed unobstructed. When the driving spring is wound up and the frame 98 is released the spring 108 presses again the shaft 86 in the position indicated in Fig. 14 so that the pinion 106 and the spur wheel 107 are uncoupled. The running axle 86 runs therefor light and the spring motor being wound up can transmit its power to the shaft 75 over the spur wheel 79 engaging again.

A similar arrangement, as shown in Figs. 14 and 15 is illustrated in the Figs. 16 and 17, in which a three-wheeled vehicle is provided instead of a four-wheeled toy.

On the shaft 86 is fixed the single running wheel 109 which causes the winding up of the spring motor in the same manner as indicated in Figs. 14 and 15. Owing to the more compact construction of this device the spur wheel 107 according to Fig. 14 may be omitted.

In Figs. 18 and 19 the friction wheel 7 is fixed on the shaft 84 which also carries the spring 83. On this shaft is further rigidly secured in known manner an arm 110 which engages with its resilient ends the holes 111 of a lock wheel 112 and forms a one-way clutch therewith to prevent turning back of shaft 84. The lock wheel engages pinion 113 arranged with the spur wheel on a shaft 115. The spur wheel 114 gears with the pinion 76 on the shaft 75 carrying the driving wheels 71, 72. The running wheels 73, 74 are pressed against the ground in the same manner by a spring 116 as indicated in Fig. 12. Is the frame 98 pressed downwards the friction wheel 7 comes in contact with the ground and during pushing the toy vehicle the spring 83 is wound up.

A further form of construction of the spring motor is illustrated in the Figs. 20 and 21. The frame of the spring motor is journaled in the toy body frame 1 and consists of the sides 117 and 118, of the front 119 and the rear 120. For increasing the stability of the work frame it is preferred to construct the front side 119 and in some cases the rear side obliquely whereby a better distribution of the various parts and of the weight in the spring motor is obtained. On the shaft 4 the driving spring 6, the friction wheel 7 and the driving spur wheel 8 are mounted. The latter gears with a pinion 121 connected rigidly with the spur wheel 122 engaging with a pinion 123, which is arranged loosely on one or both the driving axles 124, 125. In addition to this, a differential gear is provided which consists of the pinion 123 and both the bevel wheels 126, 127, the planet wheel 128 and the stirrup member 129, in which said planet wheel 128 is journaled, while the pinion 123 is fixed to said stirrup member. It is preferable for this purpose to close the frame 129 of the differential gear at 130 in order to create a counter weight against the frame part 129 and the planet wheel 128. The closing part 130 of the stirrup member is executed accordingly in thickness and fitted with a counter weight or made longer than the frame part 129 weighted with the spur wheel 128 of the differential gear. The stirrup member 130 can be modified in such a manner, that the legs 131, 132 of the U-shaped stirrup member 129 are provided with reinforced end pieces. By this weight balance in the differential gear equalized rotating masses are created with regard to the axles 124, 125, so that the engagement of the driving wheel 122 with the pinion 123 takes place easier and quicker. A further advantage is an easier and freer turning of the axles 124 and 125 during running on the ground.

In the Figs. 20 and 21 the pinion 121 and the spur wheel 122 are carried by a lever 133 being turnably arranged about the shaft 4. Said lever 133 and the spur wheels 121 and 122 are illustrated separately in the Figs. 22 and 23. On the lever 133 projections 134 are arranged which may be stamped out of the material of the lever 133 as shown in Fig. 23. These projections serve on the one hand for keeping the distance between the lever 133 and the wheel 8, on the other hand they serve as a kind of coupling between the wheel 8 and the lever 133. In using a friction wheel for winding up or pushing a spring motor provided with this device it is necessary to disengage the pinion 123 and the spur wheel 122 from each other, as above described. When the toy is pushed in the direction of the arrow 135 the friction wheel 7 runs upon the ground 54, thus the lever 133 is moved in the position shown in Fig. 21. The spur wheel 122 and the pinion 123 are disengaged during this operation. In order to engage the spur wheel 122 with the pinion 123 as quickly as possible during the running down of the spring in a direction opposite to that of the winding the projections 134 are also of particular importance. These projections touch the spur wheel 8 lightly, they are engaged and displaced upwards owing to the motion of said spur wheel in opposite direction, whereby the spur wheel 122 is engaged again by pinion 123. The distance from the spur wheel 8 may be also secured by the sleeve 136, as shown in Fig. 20 by dotted lines.

It has been found to be desirable to limit the rocking motion of the lever 133 which is obtained for instance, by means of a pin 137 located in a slot 138 in the side 118 of the frame. This limitation of motion may be also provided by a simple extension 139 bent over or soldered on the frame respectively.

As shown in Fig. 24 the lever 133 may be provided with a sleeve 140 which is secured in the frame part 118 by bending over its terminal portions 141. This sleeve 140 serves in this form of construction simultaneously as bearing for the shaft 4.

It has been found that it is not absolutely necessary to have the rocking point of the lever 133 coincide with the axis of the shaft 4. As illustrated in the Fig. 25 the lever 133 is journaled rockably in the frame part 118 for example by means of a bolt 142 or in some other equivalent way.

In Fig. 26 the fastening of the front wheels to the cross rod 50 is shown. This figure clearly illustrates that on the disc 62 constructed similar to a brake drum sleeves 143 are arranged, in the bores 144 of which the extensions 145, 146 can be pressed. Said extensions 145, 146 are attached to the cross rod 50 journaled rigidly in the toy body 1 and serve as bearing pivot for the vertical rocking motion of the wheels. On the left side of the Fig. 26 the pivots 145, 146 are shown in elevated position and on the right side in lowered position.

A modified form of construction for the fastening of the wheels is shown in Fig. 27, in which pivots 147, 148 are arranged on the disc 62 formed like brake discs. The cross rod 50 is provided with slots 149, 150 and with arms 151, 152, 153, 154 leaving the slots 149 and 150. The arms 153, 154, 151, 152 are fitted at their ends with levers 155, 156, 157, 158. By bending up said arms they engage in the bores 155, 156 of the pivots 147, 148 as shown on the right side of Fig. 27.

In the form of construction for fastening the front wheels depicted in Fig. 28, laps 159, 160, 161, 162 are stamped out having a bore. The sleeve 143 is arranged on the disc 62. The fastening of the disc 62 to the toy body 1 is executed by aid of the pins 163, 164 being passed through the laps 159, 160 and 161, 162 respectively and the sleeve 143. In the form of construction shown in Fig. 28 the front part of the steering rod 47 may be journaled in the toy body 1 itself.

The Fig. 29 illustrates a modified form of fastening the wheel body on the axle stumps 64 and 32 respectively, on which is mounted a hub 163 having at its rear end a screw head 164 and at its front end a thread 165. Hub 163 is provided with a flange 166. On said thread 165 is screwed a cap 168 fitted with a screw head 167 and a flange 169. Between the flanges 166 and 169 the wheel body is clamped, which is fitted in the same way as shown in Fig. 1.

In Fig. 30 a further modified form of fastening the wheel onto the axle 64, 32 by means of a bayonet joint is shown. Said fastening consists of a pin 184 fixed on the axle 64, 32 and adapted to engage a slot 186 in cap 185, in order to be secured thereto by means of a rotational displacement. Said cap 185 is also provided with a flange 169 as shown in Fig. 29. The wheel body according to Fig. 30 is formed on its circumference with round surfaces 187, 188 having shoulders 189, 190 and a groove 191. The rubber tire 192 is put on over the shouldered part of the wheel body. Rubber tire 192 is provided with an inside projection 193 engaging groove 191 in the wheel body.

Fig. 31 illustrates a particular construction of the hub 193 and of the cap 168, in which the hub 163 is provided with a cavity 170 and the cap 168 also with one 171, so that after screwing together the cavities 170, 171 form a trough, into which the solid tire 172 is inserted in any suitable way without being expanded.

A similar form of construction is shown in Fig. 32. The hub 163 has an elongated flange 173 fitted with a cylindrical extension. Between the flanges 173, 175 the tire 172 is clamped and adapted to rest on the cylindrical part 174.

The Figs. 33 and 34 illustrate the construction of the friction wheel 7 consisting of the two parts 176, 177 and the ring 178 made of a material with yielding surface, for instance, rubber. The part 176 carries projections 179 engaging corresponding apertures 180 in part 177. Said apertures are formed by laps 181 fixed to the part 177. The laps 181 are provided with projections 182 passing through holes 183 of the part 176 and being bent over after connecting the parts 176, 177, as shown in Fig. 33. The friction surface 178 is either pushed on one of the parts 176 or 177 before connecting or inserted into the groove formed by the parts 176, 177 and the projections 179, 181 after bending over.

In the bottom of the toy body an opening 204 is provided through which the differential gear becomes visible from the underside. Through a further opening 205 the friction wheel 7 projects.

What I claim is:

1. In a toy vehicle, the combination comprising a body, a spring motor mounted in said body, driving wheels rotatably mounted in said body and adapted to be driven by said spring motor, and a friction wheel associated with said spring motor, said friction wheel being normally inoperative and being adapted to be actuated and to be engaged by the ground to wind said spring motor.

2. In a toy vehicle, the combination comprising a body, a spring motor mounted in said body, driving wheels rotatably mounted in said body and adapted to be driven by said spring motor, and a friction wheel geared to said spring motor, said friction wheel capable of being displaced from an inoperative into an operative and ground-engaging position to wind up said spring motor when said body is displaced.

3. In a toy vehicle, the combination comprising a body, a spring motor mounted in said body, driving wheels rotatably mounted in said body and adapted to coact with said spring motor to propel said vehicle, a friction wheel geared to said spring motor capable of being displaced from an inoperative into an operative and ground-engaging position to wind up said spring motor, and coupling means intermediate said spring motor and said driving wheels.

4. In a toy vehicle, the combination comprising a body, a spring motor mounted in said body, driving wheels rotatably mounted in said body and adapted to coact with said spring motor to propel said vehicle, a friction wheel geared to said spring motor capable of being displaced from an inoperative into an operative and ground-engaging position to wind up said spring motor, and coupling means intermediate said spring motor and said driving wheels and adapted to uncouple said wheels from said motor when said friction wheel is in its operative position.

5. In a toy vehicle, the combination comprising a body, front and rear axles journaled in said body, wheels mounted on said axles, a spring motor mounted in said body and connected to at least one of said axles to propel said vehicle, and a friction wheel operatively associated with said spring motor located between said front and rear axles, said friction wheel capable of being displaced in relation to the ground from an inoperative into an operative and ground-engaging position to wind up said spring motor.

6. In a toy vehicle, the combination comprising a body, front and rear axles journaled in said body, wheels mounted on said axles, a spring motor mounted in said body and connected to at least one of said axles to propel said vehicle, and a friction wheel operatively associated with said spring motor located substantially in the longitudinal axis of said toy body, said friction wheel capable of being displaced in relation to the ground from an inoperative into an operative and ground-engaging position to wind up said spring motor.

7. In a toy vehicle, the combination comprising a body, a spring motor mounted in said body, driving wheels journaled in said body and adapted to coact with said spring motor to propel said vehicle, and a friction wheel operatively associated with said spring motor capable of being displaced from an inoperative into an operative and ground-engaging position to wind up said spring motor, said friction wheel including two mutually engaging parts, and a ring member constituting the friction surface inserted between said parts.

8. In a toy vehicle, the combination comprising a body, a spring motor mounted in said body, driving wheels journaled in said body and adapted to coact with said spring motor to propel said vehicle, and a friction wheel operatively associated with said spring motor capable of being displaced from an inoperative into an operative and ground-engaging position to wind up said spring motor, said friction wheel including two mutually engaging parts and a ring member of yielding material inserted between said parts and constituting the friction surface.

9. In a toy vehicle, the combination comprising a body, a spring motor mounted in said body, wheels journaled in said body and adapted to coact with said spring motor to propel said vehicle, a friction wheel operatively associated with said spring motor and adapted to wind said spring motor, and means actuated by relative movement between said body and the ground to displace said friction wheel from an inoperative into an operative and ground-engaging position to wind said spring motor when said body is displaced on the ground.

10. In a toy vehicle, the combination comprising a body, wheels rotatably mounted in said body, a spring motor frame constituted of two jointedly connected portions mounted in said body and having one of its portions rigidly connected thereto, resilient means for displaceably holding the other frame portion in a predetermined position, a spring motor for driving said wheels and a friction wheel operatively associated therewith journaled in said displaceable frame portion, said friction wheel being normally inoperative and being adapted to be actuated and moved into operative position when pressure is exerted on said body and said displaceable frame portion is displaced in said body.

11. In a toy vehicle, the combination comprising a body, wheels rotatably mounted in said body, a spring motor frame rigidly connected to said body, a spring motor shaft for driving said wheels journaled in said frame and displaceable therein, a friction wheel mounted on said shaft, and resilient means for holding said displaceable shaft in one of its positions, said friction wheel being normally inoperative and capable of being displaced into an operative position when pressure is applied on said toy body to cause displacement of said shaft.

12. In a toy vehicle, the combination comprising a body, wheels rotatably mounted in said body, a spring motor frame rigidly connected to said body, a spring motor shaft for driving said wheels journaled in said frame and displaceable therein, a friction wheel mounted on said shaft, resilient means for holding said displaceable shaft in one of its positions, and a steering wheel and spindle adapted to coact with and to displace said shaft, said friction wheel normally being in an inoperative position and being adapted to be displaced into an operative position when pressure is applied on said steering wheel and said shaft is displaced.

13. In a toy vehicle, the combination comprising a body, a spring motor frame rigidly connected to said body, a pair of front wheels having an axle journaled in said frame and capable of substantially parallel displacement therein, resilient means for retaining said axle in a predetermined position with respect to said frame, spring motor means mounted in said frame, and a friction wheel associated with said frame for winding said motor, said friction wheel being inoperative in the normal position of said axle in said frame and capable of being engaged by a ground surface when said frame is depressed and said axle is displaced therein.

14. In a toy vehicle, the combination comprising a body, a rigid spring motor frame mounted in said body, a rear axle carrying a pair of running wheels journaled in said frame and displaceable therein, resilient means for retaining said axle in a predetermined position with respect to said frame, spring motor means mounted in said frame, and coupling means intermediate said axle and said spring motor means, said coupling means being inoperative in the normal position of said axle and being adapted to be actuated to couple said rear axle with said spring motor means and to wind up said spring motor means by rotation of said rear wheels when said rear axle is displaced in said frame.

15. In a toy vehicle, the combination comprising a body, a rigid spring motor frame mounted in said body, front and rear axles journaled in said frame and carrying wheels at least one of said axles being constructed and arranged to be capable of resilient displacement in a substantially vertical direction, a spring motor shaft journaled in said frame, a friction wheel rigidly connected to said shaft, driving gears for one of said axles, and a one-way clutch between said spring motor shaft and said driving gears, said friction wheel normally being in an inoperative position and being adapted to be engaged by a ground surface for winding up said spring motor shaft when said displaceable axle is displaced in said frame.

16. In a toy vehicle, the combination comprising a body, a spring motor frame mounted in said body, a spring shaft journaled in said frame, a friction wheel mounted on said shaft and adapted to be actuated to wind said spring shaft, a differential gear mounted in said frame, rear wheels operatively associated with said differential gear, and coupling means intermediate said spring shaft and said differential gear and including a rocking lever pivoted around said spring shaft and carrying a coupling wheel.

17. In a toy vehicle, the combination comprising a body, a spring motor frame mounted in said body, a spring shaft journaled in said frame, a friction wheel mounted on said shaft and adapted to be actuated to wind said spring shaft, a differential gear mounted in said frame, rear wheels operatively associated with said differential gear, coupling means intermediate said spring shaft and said differential gear and including a rocking lever pivoted around said spring shaft and carrying a coupling wheel, and projections arranged on said rocking lever and adapted to keep the distance between said lever and the other parts of said coupling means.

18. In a toy vehicle, the combination comprising a body, a spring motor frame mounted in said body, a spring shaft journaled in said frame, a friction wheel mounted on said shaft and adapted to be actuated to wind said spring shaft, a differential gear mounted in said frame, rear wheels operatively associated with said differential gear, coupling means intermediate said spring shaft and said differential gear and including a rocking lever pivoted around said spring shaft and carrying a coupling wheel, and a resilient sleeve arranged on said rocking lever and around said shaft and adapted to keep the distance between said lever and the other parts of said coupling means.

19. In a toy vehicle, the combination comprising a body, a spring motor frame pivotally mounted in said body, a spring motor shaft journaled in said frame, a friction wheel journaled in said frame and operatively associated with said shaft, and resilient means for holding said spring motor frame in a predetermined position, said friction wheel normally being in an inoperative position and being adapted to be moved into an operative and ground-engaging position for winding said spring shaft when said spring motor frame is pivotally displaced against the tension of said resilient means.

20. In a toy vehicle, the combination comprising a body, a pair of front wheels journaled in said body, a steering spindle for said front wheels, a spring motor frame pivotally mounted in said body, a spring motor shaft journaled in said frame, a friction wheel journaled in said frame and operatively associated with said shaft for winding the same, and a helical spring stretched between said steering spindle and said pivoted spring motor frame whereby said spring motor frame will be resiliently held in an elevated position in which said friction wheel is inoperative and said steering spindle will be frictionally retained in any of its positions.

21. In a toy vehicle, the combination comprising a body, a spring motor frame mounted in said body, driving wheels having axles journaled in said frame, a spring motor shaft for driving said wheels, a friction wheel adapted to be actuated to wind said spring motor shaft, and a gear and pinion wheel mounted in slots in said frame, said wheel being capable of transmitting rotation of said shaft to said driving wheels when said shaft is rotated in one direction and capable of being displaced in said slots and to uncouple said shaft and said driving wheels when said shaft is rotated in the opposite direction during the winding operation.

22. In a toy vehicle, the combination comprising a body, a spring motor mechanism mounted in said body, driving axles journaled in said frame, differential gear means including a stirrup member for driving said axles by said spring motor mechanism, and an opening in the bottom portion of said body to render the differential gear means visible from the underside.

23. In a toy vehicle, the combination comprising a spring motor frame, axles journaled in said frame, axle stumps mounted at the outer ends of said axles, wheel-holding discs on said stumps, and polygonal surfaces integrally formed with the inner ends of said stumps and adapted to be engaged by a wrench.

24. In a toy vehicle, the combination comprising a spring motor frame, axles journaled in said frame, axle stumps formed by the ends of said axles, wheel-supporting discs mounted on said axle stumps, a ring-shaped aperture in each of said discs, and a friction lining on one of the surfaces of said discs.

25. In a toy vehicle, the combination comprising a spring motor frame, axles journaled in said frame, axle stumps integraly formed with the ends of said axles, wheel-holding discs mounted on said axle stumps and having a brake-drum simulating form, and a steering lever engaging said discs.

26. In a toy vehicle, the combination comprising a spring motor frame, axles journaled in said frame, axle stumps mounted on the ends of said axles, wheels mounted on said stumps, and a nut having lateral projections for retaining said wheels on said stumps.

27. In a toy vehicle, the combination comprising a wheel body, a cap connected to said wheel body, a hub located within said wheel body, and bayonet joint means associated with said cap and said hub for removably securing said hub and said wheel body together.

28. In a toy vehicle, the combination comprising a wheel body having a wedge-shaped circumferential form, and a rubber tire having a groove of substantially rectangular form therein mounted on said wheel body and adapted to be expanded to simulate a conventional automobile tire.

29. In a toy vehicle, the combination comprising a wheel body consisting of two parts, a hub integral with one of said parts, cylindrical extensions in said hub and adapted to serve as rim for a tire, and a cap connected to said hub and adapted to laterally retain said tire.

30. In a toy vehicle, the combination comprising a body, a cross rod rigidly mounted in said body, a pair of arms at each end of said cross rod and having a slot therebetween, bores in the ends of said arms, a wheel for each end of said cross rod, and pivoting pins associated with said wheels and engaging said bores.

31. In a toy vehicle, the combination comprising a body, a pair of front wheels pivotally mounted in said body, a steering lever connecting said wheels and having a toothed portion, a steering spindle coacting with said toothed portion, said toothed portion being so constructed and arranged that the teeth thereof do not project above said body in any of the positions of the steering spindle.

32. In a toy vehicle, the combination comprising a body, a pair of front wheels pivotally mounted in said body, a steering lever connecting said wheels and having a toothed portion, a steering spindle coacting with said toothed portion, and resilient clamp means for retaining said spindle in any of its given positions and to prevent accidental displacements thereof.

33. In a toy vehicle, the combination comprising a body, a cross rod mounted in said body, a pair of front wheels pivotally mounted at the ends of said cross rod, a steering lever connecting said wheels and having a toothed portion, a steering spindle mounted in said body and having its lower end journaled in the center portion of said cross rod, a pinion wheel on said spindle engaging said toothed portion of said steering lever, said toothed portion having such curvature as to remain in engaging position with said pinion in any of the relative positions of said cross rod and of said steering lever.

34. In a toy vehicle, the combination comprising a spring motor frame, driving axles journaled in said frame, a stirrup member connecting said axles and carrying a differential gear, a spring motor mechanism in said frame and driving said axles through said differential gear, and a balance weight arranged on said stirrup member to equalize the distribution of weight therein.

HEINRICH MÜLLER.